United States Patent [19]

Sandvik

[11] Patent Number: 4,645,082

[45] Date of Patent: Feb. 24, 1987

[54] MEANS FOR SUSPENDING A SKID PAN FROM A WINCH MOUNTED ON A TRACTOR

[75] Inventor: Johannes Sandvik, Stokke, Norway

[73] Assignee: Elkem a/s, Oslo, Norway

[21] Appl. No.: 793,490

[22] Filed: Oct. 30, 1985

Related U.S. Application Data

[63] Continuation of Ser. No. 567,570, Jan. 3, 1984, abandoned.

[30] Foreign Application Priority Data

Jan. 19, 1983 [NO] Norway ................................. 830165

[51] Int. Cl.$^4$ ........................................... B66C 23/00
[52] U.S. Cl. .................................... 212/141; 212/167; 414/538; 414/571
[58] Field of Search ....................... 212/141, 167, 271; 144/34 A; 414/352, 537, 538, 571

[56] References Cited

U.S. PATENT DOCUMENTS

| | | | |
|---|---|---|---|
| 719,372 | 1/1903 | Renger | 414/538 |
| 1,823,380 | 9/1931 | Schroeder | 414/538 |
| 2,156,183 | 4/1939 | King | 414/538 |
| 2,413,048 | 12/1946 | Hurd | 414/538 |
| 2,827,715 | 3/1958 | Wagner | 414/538 |
| 3,265,428 | 8/1966 | Gilbert et al. | 414/538 |
| 3,517,839 | 6/1968 | Jorgensen | 414/559 |
| 3,926,410 | 12/1975 | McLeod | 144/34 A |

FOREIGN PATENT DOCUMENTS

| | | | |
|---|---|---|---|
| 528385 | 7/1956 | Canada | 414/538 |
| 99395 | 2/1962 | Norway | 144/34 A |

Primary Examiner—Trygve M. Blix
Assistant Examiner—Stephen P. Avila
Attorney, Agent, or Firm—Lucas & Just

[57] ABSTRACT

The present invention relates to system for suspending a skid pan from a winch mounted on a tractor. The skid pan 2 is pivotably suspended from the winch frame 1 by a bolt 3. Stoppers 5 are fastened to the winch frame 1 in order to prevent the skid pan from swinging forward in the normal driving direction of the tractor. The skid pan can be locked in vertical position by a second bolts 4 which can be put into corresponding holes 6 in the skid pan 2 and the which frame 1.

5 Claims, 4 Drawing Figures

MEANS FOR SUSPENDING A SKID PAN FROM A WINCH MOUNTED ON A TRACTOR

This is a continuation of application Ser. No. 567,570, filed Jan. 3, 1984, now abandoned.

The present invention relates to means for suspending a skid pan from a winch mounted on a tractor.

Skid pans secured to winches mounted on tractors are known. The hitherto known skid pans are rigidly secured to the winch frame by means of a plurality of bolts and nuts. When the skid pan in this way is rigidly secured to the winch frame, there is little clearance between the lower edge of the skid pan and the terrain. When the skid pan with timber secured to it is towed by the tractor, the skid pan therefore will bump into obstacles in the terrain such as stones and stubs. This slows down and sometimes even stops towing in rough terrain. The contact with stones and stubs prevents the progress in the terrain and also causes heavy wear on the skid pan and the winch frame. The object of the present invention is to eliminate these drawbacks and shortcomings of the known skid pans.

We have by the arrangement of the present invention arrived at a suspension arrangement for skid pans on tractor winches where the mentioned drawbacks of the known arrangements is eliminated.

The present invention thus relates to an arrangement for suspension of a skid pan on a tractor winch where the skid pan is secured to a winch frame and the invention is characterized in that the skid pan is pivotably secured to the winch frame by means of bolts.

According to a further feature of the invention stoppers are mounted on the winch frame which stoppers prevent that the skid pan can swing forward in the driving direction of the tractor. Further, corresponding holes are arranged in the winch frame and in the skid pan which makes it possible to lock the skid pan in its lower position by means of a removable bolt.

When the tractor with the skid pan and timber is driving in forward direction, the skid pan will interfere with stones and stubs in the terrain. However, because the skid pan is pivotably suspended from the winch frame, it will swing upwards and backwards when interfering with these obstacles in the terrain and in this way the skid pan with the timber will be lifted and guided over the obstacles.

When the skid pan is pivotably suspended according to the present invention, the lifting height for the tractor winch can be considerably reduced as compared to tractor winches with rigidly secured skid pans. Low lifting height for the winch also leads to more favorable angles for the top-stay and the power transmission axle of the winch.

In the following the invention will be further described with reference to the accompanying drawings which show by way of example an embodiment of the present invention:

Figure 1:
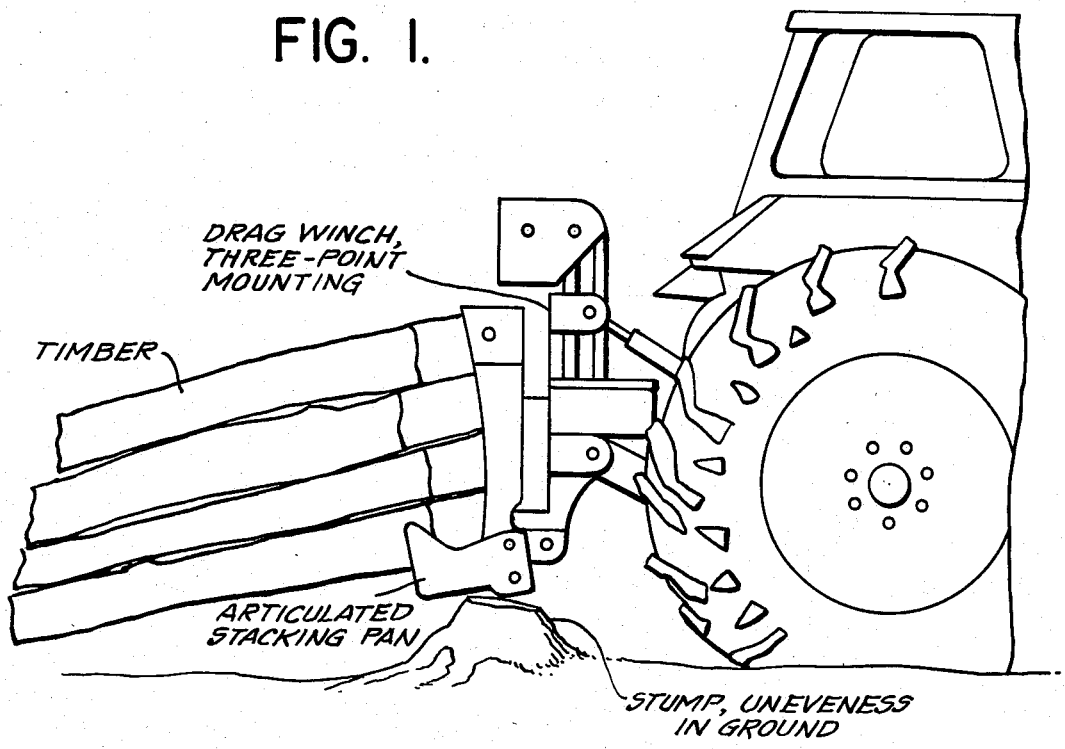
FIG. 1 is a side view showing a tractor provided with a winch and a skid pan secured to the winch frame according to the present invention.

On the figures a winch frame is indicated by reference numeral 1. For simplicity only parts of the winch frame 1 is shown on figures. A skid pan is indicated by 2. The said pan is pivotably suspended from the winch frame 1 by means of bolts and nuts 3. Second bolts 4 can be inserted into and removed from holes 6 in the winch frame and in the skid pan when the skid pan 2 is in vertical position in order to lock the skid pan in this position when wanted (see FIG. 2). Stoppers 5 are fastened in the outer ends of the winch frame 1 in order to secure that the skid pan 2 can only swing backwards seen in the driving direction of the tractor and prevent it from swinging forwards. On FIGS. 1 and 2 the driving direction of the tractor is shown by the arrows P.

Figure 2:
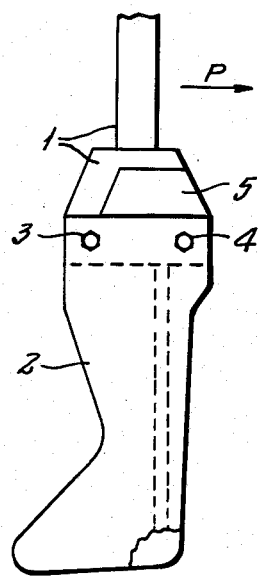
FIG. 2 is a side view showing the skid pan in vertical direction.
Figure 3:
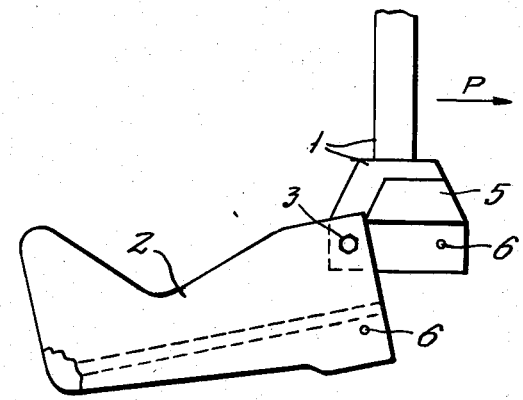
FIG. 3 is a side view showing the skid pan swung up and backwards seen in the driving direction and, FIG. 4 is a view showing the skid pan from behind.
Figure 4:
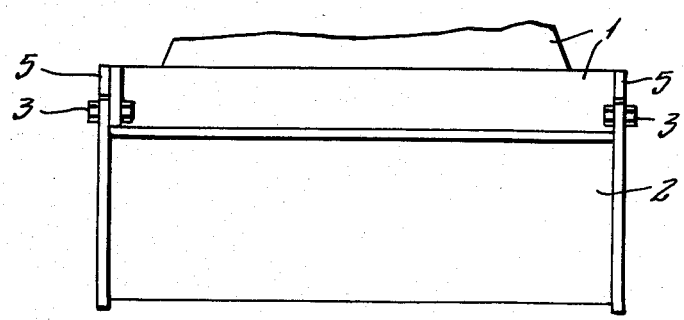

When towing in the timber by means of the winch, the skid pan is locked in vertical position by means of the second bolts 4 as shown on FIG. 2. Before the driving of the tractor starts, the second bolts 4 are pulled out and the tractor then starts to move in the direction shown by arrows P on FIG. 1 and 2.

When the skid pan bumps into obstacles in the terrain, such as stones or stubs, it will swing backwards and upwards as shown on FIG. 1. In this way the skid pan with the timber is lifted and guided over the obstacles.

I claim:

1. An apparatus for skidding logs comprising:
  (a) a winch frame vertically mounted on a vehicle, capable of raising an end of a log prior to skidding and maintaining the end of the log in the raised position while skidding;
  (b) a skid pan pivotally mounted on said winch frame, said skid pan hanging in a generally vertical direction off the ground when said log is in said raised position during said skidding and said skid pan being capable of pivoting rearwardly and upwardly when said skid pan engages an obstacle while skidding said log; and
  (c) stop member mounted on said winch frame, said stop member preventing said skid pan from swinging forwardly and upwardly in the direction of said vehicle.

2. The apparatus of claim 1 wherein said winch frame and said skid pan are equipped with holes so that the skid pan can be locked in a vertical position by means of a bolt.

3. The apparatus of claim 1 wherein said winch frame and said skid pan are equipped with holes so that the skid pan can be locked in a vertical position by means of a bolt.

4. An apparatus for skidding logs comprising:
  (a) a winch frame vertically mounted on a vehicle, capable of raising an end of a log prior to skidding and maintaining said end of said log in said raised position while skidding;
  (b) a skid pan pivotally mounted at the bottom rear portion of said winch frame, said skid pan hanging in a generally vertical direction off the ground when said end of said log is in said raised position during skidding and said skid pan being capable of pivoting rearwardly and upwardly when said skid pan engages an obstacle while skidding said log; and
  (c) a stop member permanently mounted at the bottom forward position of said winch frame, said stop member being mounted such that said skid pan is prevented from swinging forwardly and upwardly past the vertical plane of said vertically mounted winch frame but does not prevent said pan from swinging rearwardly and upwardly.

5. The apparatus of claim 4 further comprising:

(a) a bolt; and
(b) a hole in said skid pan and a hole in said winch frame, each said hole being positioned such that when said skid pan is moved downwardly and forwardly into said vertical plane, said holes align and said bolt can be placed into the aligned holes to lock said skid pan into a vertical position.

* * * * *